US012643613B2

(12) United States Patent (10) Patent No.: US 12,643,613 B2
Nagasawa (45) Date of Patent: Jun. 2, 2026

(54) VEHICLE BODY FRONT PART STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 347 days.

(21) Appl. No.: 18/593,081

(22) Filed: Mar. 1, 2024

(65) Prior Publication Data

US 2024/0308595 A1 Sep. 19, 2024

(30) Foreign Application Priority Data

Mar. 14, 2023 (JP) .................................. 2023-040074

(51) Int. Cl.
*B62D 25/20* (2006.01)
(52) U.S. Cl.
CPC .............................. *B62D 25/2018* (2013.01)
(58) Field of Classification Search
CPC .............. B62D 25/2018; B62D 25/085; B62D 25/082; B62D 25/084; B62D 25/08; B62D 21/11; B62D 21/152; B62D 21/155; B62D 27/00
USPC ...................................................... 296/204
See application file for complete search history.

(56) References Cited

U.S. PATENT DOCUMENTS

2007/0262614 A1* 11/2007 Asai ...................... B62D 21/152
296/193.09
2017/0291643 A1* 10/2017 Sakamoto ............... B60L 50/51

2020/0283068 A1* 9/2020 Murai ...................... B60K 1/00
2023/0415817 A1* 12/2023 Nagasawa ............ B62D 21/152
2024/0300581 A1* 9/2024 Nagasawa ............ B62D 25/084
2024/0308594 A1* 9/2024 Nagasawa ............ B62D 25/085
2025/0026408 A1* 1/2025 Nagasawa ............. B62D 21/11
2025/0026412 A1* 1/2025 Nagasawa ............ B62D 21/152

FOREIGN PATENT DOCUMENTS

CN 117360631 A * 1/2024 ........... B62D 25/082
CN 117601791 A * 2/2024 ............. B60R 19/34
CN 112977634 B * 8/2024 ......... B62D 25/2036
DE 102020214064 A1 * 2/2022 ........... B62D 21/155
FR 3001696 A1 * 8/2014 ........... B62D 25/084
JP 2006-290224 A 10/2006

(Continued)

*Primary Examiner* — Hilary L Gutman
(74) *Attorney, Agent, or Firm* — Smith, Gambrell & Russell, LLP

(57) ABSTRACT

A vehicle body front part structure includes a radiator panel frame, front side frames in a pair, sub frames, an inverter unit, a front cross member, upper frame reinforcing members in a pair, and radiator auxiliary frames. The radiator panel frame forms a framework at a front side of a vehicle. The front side frames are joined to the radiator panel frame. The front side frames have recessed slide grooves. The sub frames are joined to lower outer parts of the radiator panel frame. The inverter unit is disposed between the front side frames. The front cross member is joined to the front side frames. The upper frame reinforcing members are bent downward and are joined to the front side frames and the sub frames. The radiator auxiliary frames are bent inward at lower ends and include projections that slidably engage with the slide grooves in the front side frames.

2 Claims, 6 Drawing Sheets

(56) References Cited

FOREIGN PATENT DOCUMENTS

| JP | 2008174179 | A | * | 7/2008 | |
| WO | WO-2009008426 | A1 | * | 1/2009 | ........... B62D 25/082 |
| WO | WO-2014097513 | A1 | * | 6/2014 | ............. B62D 21/11 |
| WO | WO-2016192304 | A1 | * | 12/2016 | ............. B62D 25/10 |

* cited by examiner

FIG. 2A
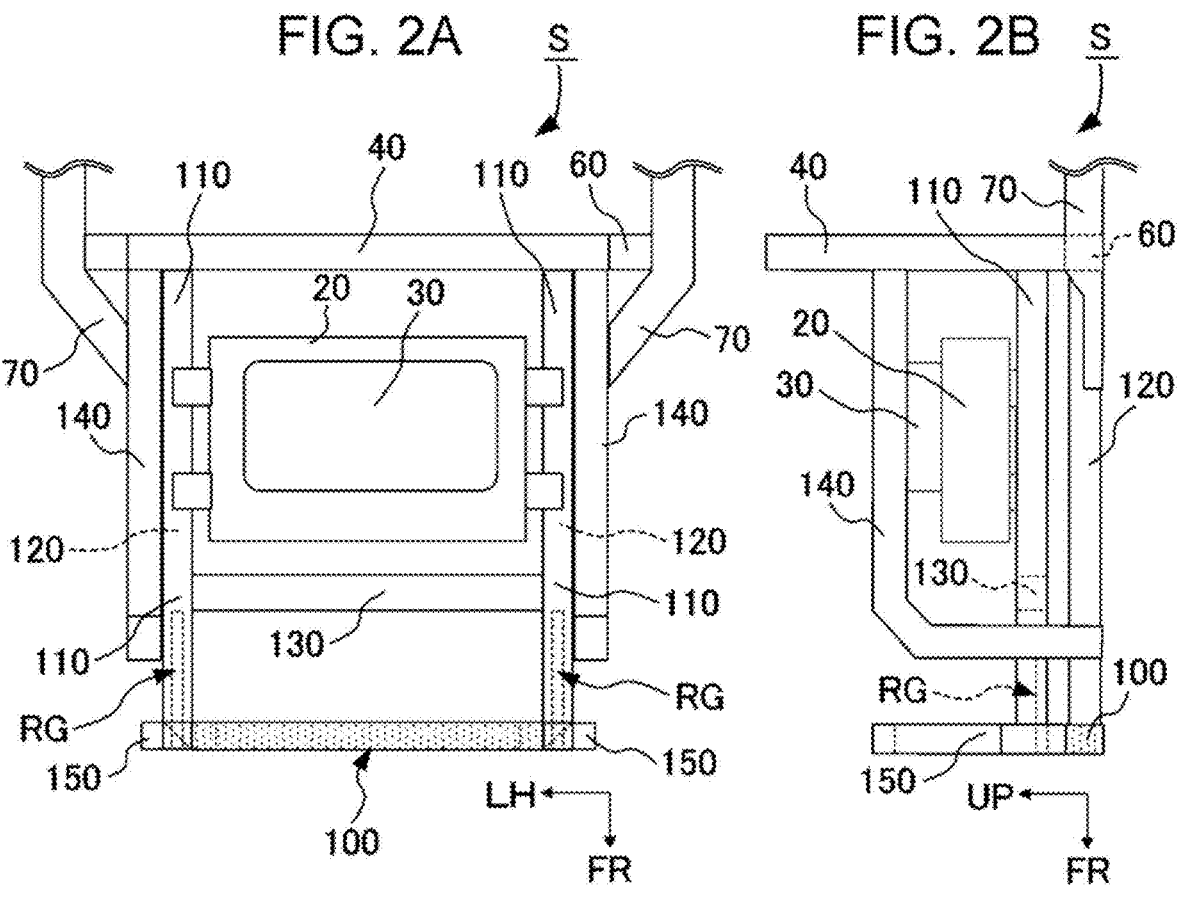
FIG. 2B
FIG. 2C
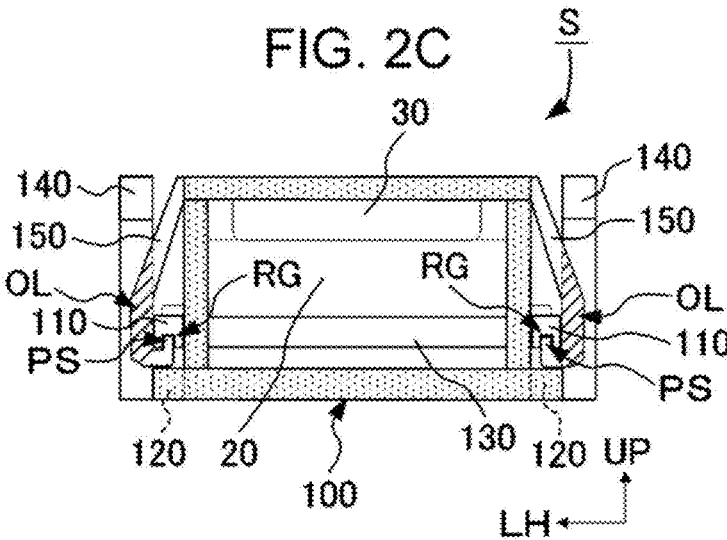

UP

LH

UP

LH

UP

LH

1

VEHICLE BODY FRONT PART STRUCTURE

CROSS-REFERENCE TO RELATED APPLICATIONS

The present application claims priority from Japanese Patent Application No. 2023-040074 filed on Mar. 14, 2023, the entire contents of which are hereby incorporated by reference.

BACKGROUND

The disclosure relates to a vehicle body front part structure.

Typically, in a frontal collision of a vehicle, preventing deformation of a cabin, which is an occupant boarding space, is an effective way to reduce injury to an occupant, and various measures are taken for this purpose. In recent years, a structure for absorbing collision energy in front of the cabin has been widely used.

When considering frontal collisions of vehicles, multiple types of collision, such as a full-overlap collision in which the whole surface of a vehicle in the vehicle traveling direction collides with an object, an offset collision or small-overlap collision in which one side of a vehicle in the vehicle traveling direction collides with an object, and an under-ride collision in which the upper side of a vehicle in the vehicle traveling direction collides with an object are taken into consideration.

In a vehicle such as a hybrid vehicle or an electric vehicle, an inverter unit for converting a DC voltage into an AC voltage to drive an electric motor may be mounted in the front of the vehicle.

The inverter unit generates a high voltage necessary for traveling of the vehicle. Hence, if the inverter unit is deformed or disconnected due to a frontal collision or the like of the vehicle, a sudden abnormal reaction may occur.

Hence, there has been a demand for a vehicle body front part structure that absorbs collision energy to prevent damage to the inverter unit in any collision type.

In response to this demand, Japanese Unexamined Patent Application Publication (JP-A) No. 2006-290224 has proposed a structure in which each of ends of a front bumper reinforcement in the longitudinal direction thereof is coupled to an upper member, a radiator support upper, a front side member, and a radiator support lower via a coupling body including first to fourth coupling members formed as a single component. In a small-overlap collision, in which an object collides with an end of the front bumper reinforcement in the longitudinal direction thereof, this structure supports the end, transmits a collision load to a body side, and absorbs the energy.

SUMMARY

An aspect of the disclosure provides a vehicle body front part structure provided in front of a cabin configured to accommodate one or more occupants in a vehicle. The vehicle body front part structure includes a radiator panel frame, front side frames in a pair, sub frames, an inverter unit, a front cross member, upper frame reinforcing members in a pair, and radiator auxiliary frames. The radiator panel frame forms a framework extending in a vehicle width direction and a vehicle vertical direction of the vehicle at a front side of the vehicle. The front side frames extend in a vehicle longitudinal direction of the vehicle, on both sides of the vehicle in the vehicle width direction, on a lower side of the vehicle, and each include a front end joined to the radiator panel frame. The front side frames each include, a lower surface including a recessed slide groove extending from the front end toward a rear side of the vehicle. The sub frames extend in the vehicle longitudinal direction, below and on outer sides of the front side frames in the vehicle width direction respectively. The sub frames each include a front end joined to a lower outer part of the radiator panel frame in the vehicle width direction. The inverter unit is disposed between the front side frames in the vehicle width direction and is configured to generate a voltage to be supplied to a driving motor of the vehicle. The front cross member extends in the vehicle width direction in front of the inverter unit and includes both ends respectively joined to the front side frames in the vehicle width direction. The upper frame reinforcing members extend in the vehicle longitudinal direction, on both sides of the vehicle in the vehicle width direction on an upper side of the vehicle, are bent downward toward the front side of the vehicle in front of the front cross member, and each are joined to a corresponding one of the front side frames and a corresponding one of the sub frames at positions behind the radiator panel frame. The radiator auxiliary frames extend in the vehicle vertical direction on outer sides of the radiator panel frame in the vehicle width direction, each includes a lower end bent inward in the vehicle width direction along the lower surface of a corresponding one of the front side frames, and each includes an inner end including a projection in the vehicle width direction. The projection is configured to slidably engage with the recessed slide groove of the corresponding one of the front side frames.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 2A to 2C are schematic views of the vehicle body front part structure illustrated in FIG. 1 without front wheels and strut towers, in which FIG. 2A is a plan view as viewed from above the vehicle, FIG. 2B is a side view, and FIG. 2C is a front view as viewed from the vehicle traveling direction;

FIGS. 3A to 3C are schematic views of an object to collide with the front side of the vehicle body front part structure, as viewed from the front side of the vehicle, in which FIG. 3A illustrates the object at the time of a full-overlap collision, FIG. 3B illustrates the object at the time of a small-overlap collision, and FIG. 3C illustrates the object at the time of an under-ride collision;

DETAILED DESCRIPTION

Figure 1:
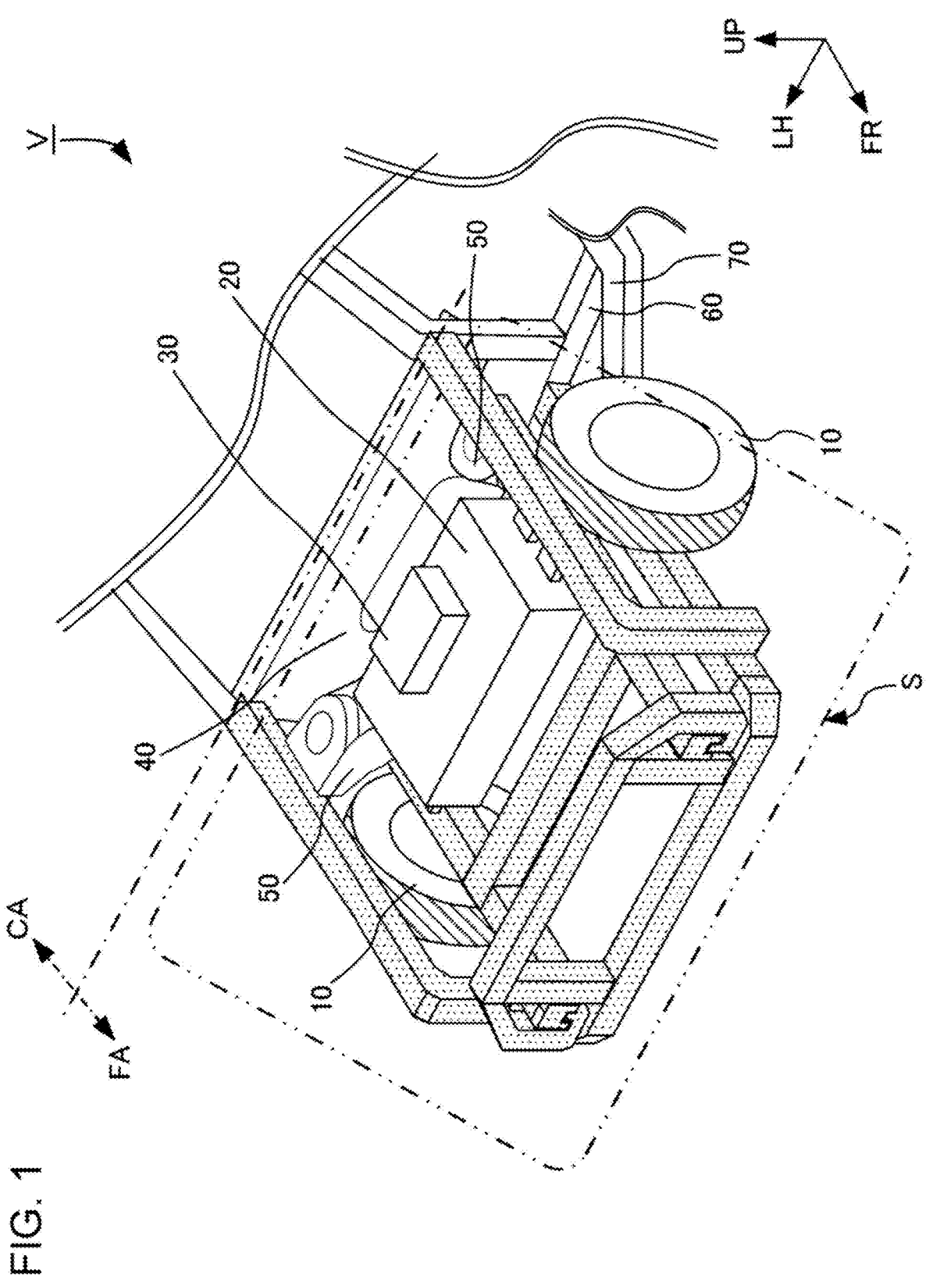
FIG. 1 is a perspective view of a vehicle body front part structure according to an embodiment of the disclosure as viewed from above.

The technique disclosed in JP-A No. 2006-290224 does not consider a full-overlap collision or an under-ride collision, and thus, there is a problem in that the inverter unit may be deformed when a full-overlap collision or an under-ride collision occurs at the front side of the vehicle.

It is desirable to provide a vehicle body front part structure that prevents deformation of the inverter unit in multiple types of frontal collision.

A vehicle V having a vehicle body front part structure S (hereinbelow, a front part structure S) according to an embodiment of the disclosure will be described with reference to FIGS. 1 to 6. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that arrows FR, UP, and LH in the drawings indicate the traveling direction of the vehicle V illustrated in FIG. 1, the upper side of the vehicle V, and the left side of the vehicle V as viewed from the vehicle traveling direction, respectively. In the following description, unless otherwise specified, a vertical (top-bottom) direction and a lateral (left-right) direction are directions as viewed from the vehicle traveling direction, and a longitudinal (front-rear) direction is a direction in which the vehicle traveling direction is the front side.

Embodiment

The structure of the front part structure S according to this embodiment, provided in the vehicle V, will be described with reference to FIGS. 1 to 6.

The description is based on an assumption that the vehicle V is an electric vehicle (EV) or a hybrid electric vehicle (HEV).

Structure of Vehicle V

The vehicle V is, for example, an electric vehicle having a power unit 20, serving as a drive source. The vehicle V may be, for example, a hybrid electric vehicle having multiple drive sources including an engine and the power unit 20.

In the vehicle V, a vehicle front chamber FA (hereinbelow, a front chamber FA) is provided in front of a cabin CA, serving as a compartment for occupants.

As illustrated in FIG. 1, the front chamber FA includes front wheels 10, the power unit 20, an inverter unit 30, a toe board 40, strut towers 50, a torque box 60, side sills 70, and the front part structure S (a dot-hatched part surrounded by a two-dot chain line in FIG. 1).

The power unit 20 is a drive device including a vehicle driving motor (not illustrated) for driving the front wheels 10, a transmission, a clutch, and a drive shaft. The power unit 20 is installed in a space surrounded by front side frames 110 (described below), a front cross member 130 (described below), the toe board 40, and the torque box 60, and is fixed in a state of being disposed on the upper surfaces of the front side frames 110.

The inverter unit 30 is disposed on and fixed to the upper side of the power unit 20. The inverter unit 30 generates a voltage to be supplied to the vehicle driving motor.

The inverter unit 30 is capable of outputting a high voltage to be supplied to the power unit 20 and generates a voltage necessary for driving the power unit 20.

The power unit 20 and the inverter unit 30 are installed in a space surrounded by a robust frame.

The front part structure S is provided in front of the power unit 20 and the inverter unit 30, and the power unit 20 and the inverter unit 30 are provided between the strut towers 50 in the vehicle width direction. The toe board 40, the torque box 60, and the side sills 70 are provided behind the power unit 20 and the inverter unit 30.

The toe board 40 is provided in front of the cabin CA so as to stand upright in the vehicle vertical direction to divide between the front chamber FA and the cabin CA. The toe board 40 is joined to the upper side of the torque box 60 and to the rear ends of the front side frames 110 by welding or the like.

The strut towers 50 are supports on the vehicle body side to which suspensions are attached, and are provided on both sides in the vehicle width direction, in front of the toe board 40. The strut towers 50 are frameworks inclined inward in the vehicle width direction from the upper side to the lower side thereof, and are formed of, for example, high rigidity metal.

The strut towers 50 are joined to upper frame reinforcing members 140 (described below) at the upper outer sides thereof, and are joined to the front side frames 110 and sub frames 120 at the lower inner sides thereof.

The torque box 60 is a member disposed between the sub frames 120 (described below) and the side sills 70 to couple the sub frames 120 and the side sills 70 to each other.

The torque box 60 is a framework extending in the vehicle width direction at the bottom of the vehicle V, and the right and left front side frames 110 are joined, at one end thereof, to the torque box 60 by welding or the like. The torque box 60 is formed of, for example, high rigidity metal, and has a closed substantially rectangular cross-section.

The side sills 70 are provided at side bottom surfaces of the vehicle, on both sides in the vehicle width direction, behind the toe board 40. The side sills 70 are frameworks extending in the vehicle longitudinal direction, are formed of, for example, high rigidity metal, and have a closed substantially rectangular cross-section.

The front part structure S is provided inside the front chamber FA in front of the toe board 40.

Hereinbelow, the structure of the front part structure S will be described.

Structure of Front Part Structure S

The front part structure S is bilaterally symmetrical in the vehicle width direction.

As illustrated in FIGS. 2A to 2C, the front part structure S includes a radiator panel frame 100, the front side frames 110, the sub frames 120, the front cross member 130, the upper frame reinforcing members 140, and radiator auxiliary frames 150.

Radiator Panel Frame 100

As indicated by dot hatching in FIGS. 2A to 2C, the radiator panel frame 100 is a framework extending in the vehicle width direction and the vehicle vertical direction at the front side of the vehicle V.

As illustrated in FIG. 2C, the radiator panel frame 100 is formed by joining frames, which are formed of, for example, metal and have a closed substantially rectangular cross-section, in a substantially rectangular shape as viewed from the vehicle traveling direction, such that the long sides extend in the vehicle width direction and the short sides extend in the vehicle vertical direction.

The ends of the lower side member of the radiator panel frame 100 protrude outward in the vehicle width direction from the short sides of the radiator panel frame 100. The sub frames 120 are joined to the protruding ends of the lower side member of the radiator panel frame 100. The radiator auxiliary frames 150 are joined to the ends, in the vehicle width direction, of the upper side of the radiator panel frame 100.

Front Side Frames 110

As illustrated in FIG. 2A, the front side frames 110 are provided in a pair and extend in the vehicle longitudinal direction on both sides of the power unit 20 in the vehicle width direction, below the power unit 20.

The front side frames 110 have, in the lower surfaces thereof, recessed slide grooves RG extending from the front ends thereof toward the rear side of the vehicle. The slide grooves RG extend linearly from the front ends of the front side frames 110 to the front end of the front cross member 130.

The front ends of the front side frames 110 are joined to the outside parts of the radiator panel frame 100 in the vehicle width direction. The rear ends of the front side frames 110 are joined to the toe board 40 by welding or the like. The front side frames 110 are joined to inside parts, in the vehicle width direction, of the upper frame reinforcing members 140, which are bent downward in the vehicle vertical direction to cross the front side frames 110, at positions where the front side frames 110 cross the upper frame reinforcing members 140.

The front side frames 110 are formed of, for example, high rigidity metal and have a closed substantially rectangular cross-section.

Sub Frames 120

The sub frames 120 are provided in a pair and extend in the vehicle longitudinal direction on both sides in the vehicle width direction, below and on the outer sides of the front side frames 110 in the vehicle width direction. The sub frames 120 are joined to the lower outer parts, in the vehicle width direction, of the radiator panel frame 100 at the front ends thereof. The rear ends of the sub frames 120 are joined to the torque box 60 and the side sills 70 by welding or the like.

The sub frames 120 are formed of, for example, high rigidity metal and have a closed substantially rectangular cross-section.

Front Cross Member 130

The front cross member 130 extends in the vehicle width direction in front of the inverter unit 30 and is joined to the front side frames 110 at the ends thereof in the vehicle width direction.

The front cross member 130 is formed of, for example, metal and has a closed substantially rectangular cross-section. The front side frames 110 and the front cross member 130 are firmly joined together by welding or the like.

Upper Frame Reinforcing Members 140

The upper frame reinforcing members 140 extend in the vehicle longitudinal direction, on both sides in the vehicle width direction, on the upper side of the vehicle, from the upper part of the toe board 40 in front of the cabin CA.

The upper frame reinforcing members 140 are bent toward the lower front side of the vehicle, at a position in front of the front cross member 130.

The upper frame reinforcing members 140 are firmly joined to the outside parts, in the vehicle width direction, of the front side frames 110 at positions where the upper frame reinforcing members 140 and the front side frames 110 cross each other, at positions behind the radiator panel frame 100. The lower front ends of the upper frame reinforcing members 140 are firmly joined to the outside parts, in vehicle width direction, of the sub frames 120 at positions in front of the front cross member 130.

The rear ends of the upper frame reinforcing members 140 are joined to the upper parts of the toe board 40 and the strut towers 50.

The upper frame reinforcing members 140 are formed of, for example, metal and have a closed substantially rectangular cross-section.

Radiator Auxiliary Frames 150

The radiator auxiliary frames 150 extend in the vehicle vertical direction on the outer sides of the radiator panel frame 100 in the vehicle width direction.

The upper ends of the radiator auxiliary frames 150 are joined to the upper outer ends of the radiator panel frame 100 in the vehicle width direction. The lower ends of the radiator auxiliary frames 150 are bent inward in the vehicle width direction along the lower surfaces of the front side frames 110. Projections PS protruding upward, formed at the lower ends of the radiator auxiliary frames 150, are slidably engaged with the slide grooves RG formed in the front side frames 110.

The radiator auxiliary frames 150 are formed of metal or the like and have a substantially rectangular closed cross-sectional shape.

As illustrated in FIG. 2C, the radiator auxiliary frames 150 extend downward at an angle, from the upper outer ends of the radiator panel frame 100 toward the outer surfaces of the front side frames 110 in the vehicle width direction The radiator auxiliary frames 150 are bent downward at positions above and on the outer sides of the front side frames 110 and are further bent inward, in the vehicle width direction, at positions below and on the outer sides of the front side frames 110. The projections PS protruding upward are formed at the inner ends of the radiator auxiliary frames 150 in the vehicle width direction.

The projections PS of the radiator auxiliary frames 150 may be fixed to the front side frames 110 with bolts or the like in a breakable manner.

Furthermore, as illustrated by diagonal hatching in FIG. 2C, a plane obtained by projecting the radiator auxiliary frames 150 toward the rear side of the vehicle and a plane obtained by projecting the upper frame reinforcing members 140 toward the front side of the vehicle overlap each other at overlapping portions OL extending in the vehicle vertical direction when viewed from the vehicle traveling direction.

The front part structure S is a robust three-dimensional framework formed by joining together the radiator panel frame 100, the front side frames 110, the sub frames 120, the front cross member 130, the upper frame reinforcing members 140, and the radiator auxiliary frames 150.

Furthermore, the front part structure S, the toe board 40, the strut towers 50, the torque box 60, and the side sills 70 are joined together to form the robust vehicle front chamber FA.

Operation

The operation of the thus-configured front part structure S according to this embodiment when an object collides head-on with the vehicle V from the vehicle traveling direction will be described.

Figure 3A:
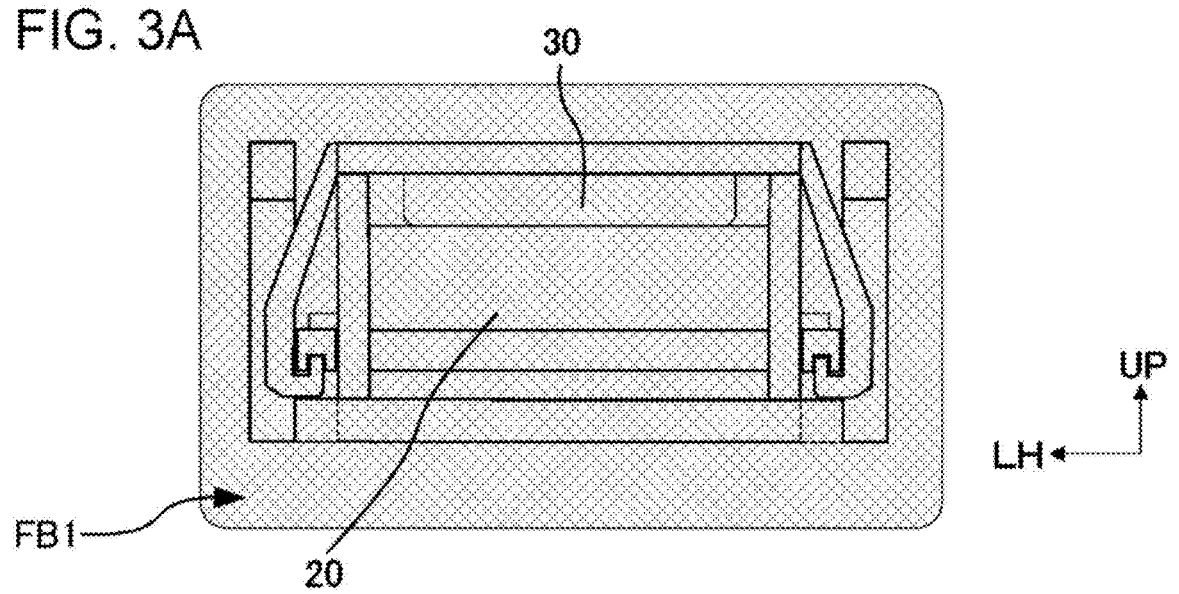

As illustrated by hatching in FIG. 3A, in a full-overlap collision, in which an object FB1 collides with the vehicle V from the vehicle traveling direction, the object FB1 collides with the front side of the vehicle V.

Figure 3B:
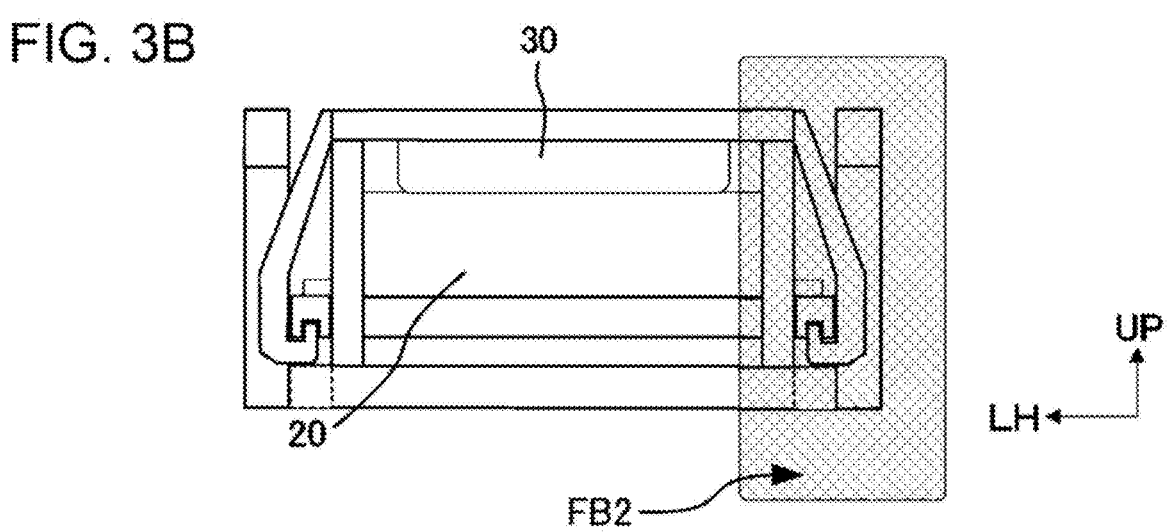

As illustrated by hatching in FIG. 3B, in a small-overlap collision, in which an object FB2 collides with the vehicle V from the vehicle traveling direction, the object FB2 collides with the right or left outer side, in the vehicle width direction, of the front part of the vehicle V.

Figure 3C:
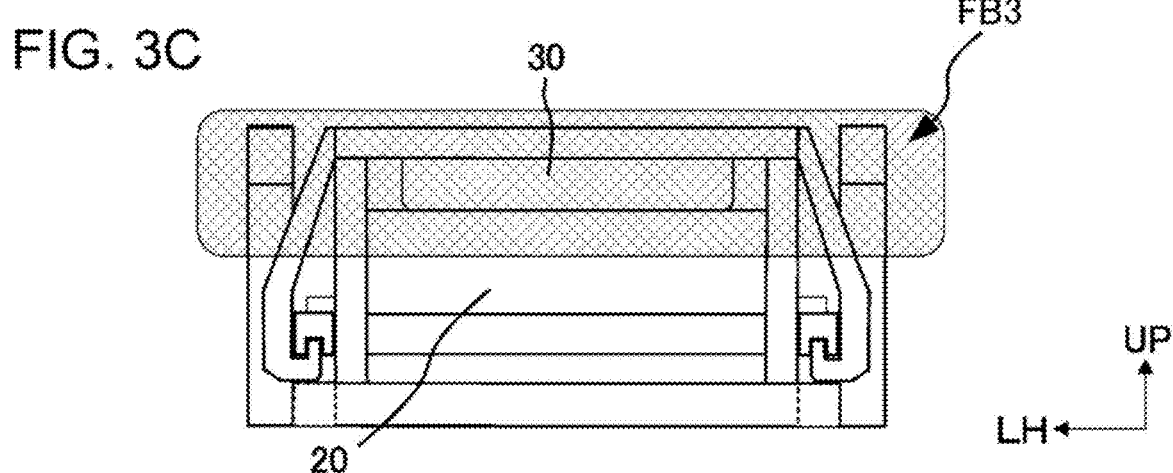

As illustrated by hatching in FIG. 3C, in an under-ride collision, in which an object FB3 collides with the vehicle V from the vehicle traveling direction, the object FB3 collides with the upper side of the vehicle V.

Full-Overlap Collision

Figure 4:
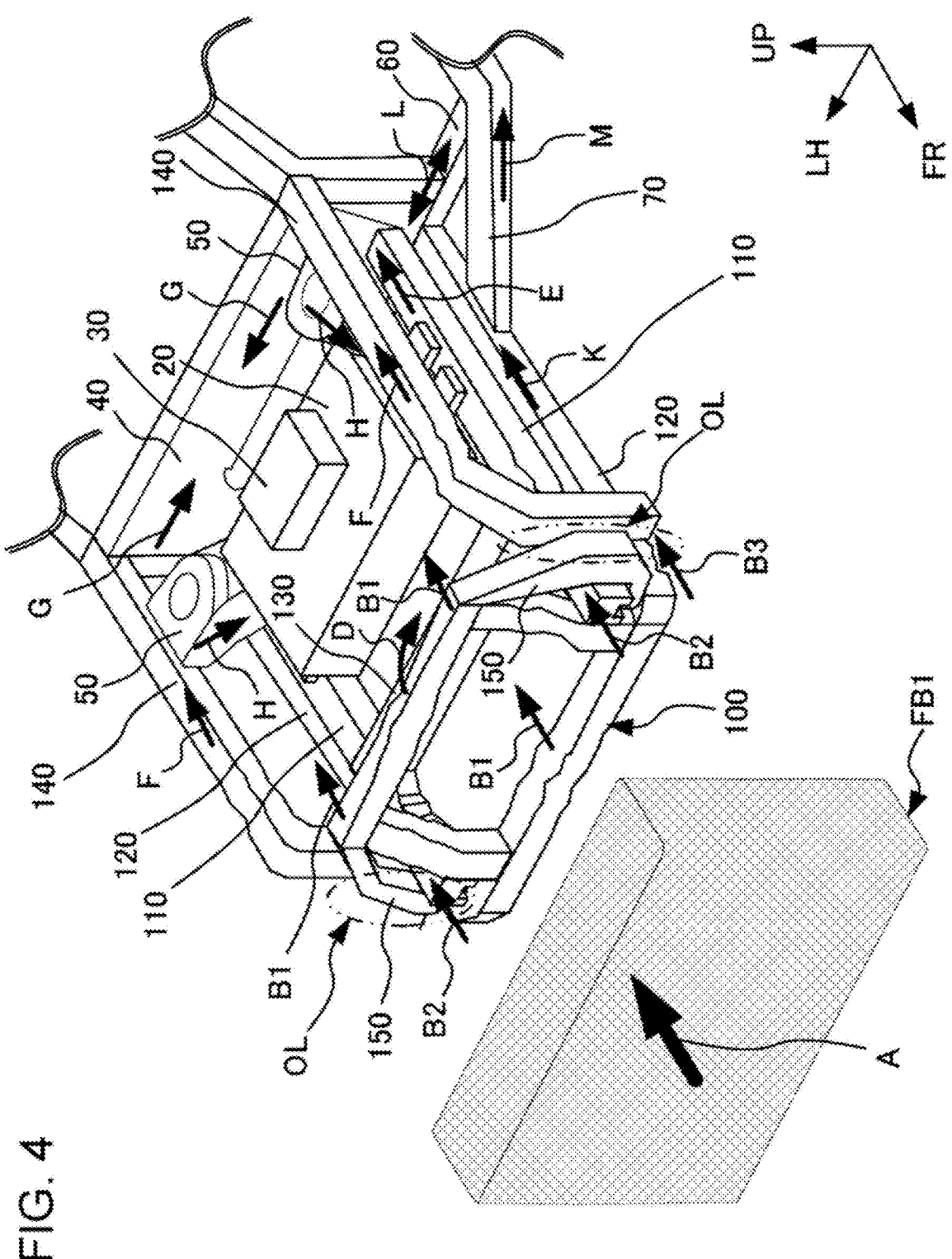
FIG. 4 is a perspective view, as viewed from above, illustrating deformation of the vehicle body front part structure according to the embodiment of the disclosure at the time of a full-overlap collision.

As illustrated in FIG. 4, in a full-overlap collision, in which the object FB1 collides with the vehicle V from the vehicle traveling direction, the object FB1 collides with the front side of the vehicle V, generating collision energy in the direction of arrow A.

The collision energy generated by the collision with the object FB1 is transmitted to the rear side of the vehicle via the radiator panel frame 100, the front side frames 110, the sub frames 120, the upper frame reinforcing members 140, and the radiator auxiliary frames 150, as indicated by arrows B1 to B3.

The collision energy indicated by arrows B1, directed from the front side to the rear side of the vehicle, is transmitted to the radiator panel frame 100. The radiator panel frame 100 is pushed toward the rear side of the vehicle while tilting in the direction of arrow D.

The collision energy indicated by arrows B2, directed from the front side to the rear side of the vehicle, is transmitted to the front side frames 110. The front ends of the front side frames 110 are crushed by the collision energy, and the collision energy is absorbed by the deformation of the front ends of the front side frames 110.

Furthermore, the collision energy transmitted to the front side frames 110, indicated by arrow E, is distributed to and absorbed by the toe board 40, which is joined to the rear side of the front side frames 110, as indicated by arrows G.

The collision energy indicated by arrow B3, directed from the front side to the rear side of the vehicle, is transmitted to the sub frames 120 via the radiator panel frame 100. The front ends of the sub frames 120 are crushed by the collision energy, and the collision energy is absorbed by the deformation of the front ends of the sub frames 120.

Furthermore, the collision energy transmitted to the sub frames 120, indicated by arrow K, is distributed among and absorbed by the toe board 40, the torque box 60, and the side sills 70, which are joined to the rear side of the sub frames 120, as indicated by arrows G, L, and M, respectively.

The radiator panel frame 100 is pushed by the collision energy indicated by arrows B1 and moves toward the rear side of the vehicle. Then, the radiator panel frame 100 starts to tilt toward the lower rear side of the vehicle, as indicated by arrow D, so as to rotate about the lower side member of the radiator panel frame 100.

At this time, the projections PS provided at the bottoms of the radiator auxiliary frames 150 slide toward the rear side of the vehicle in the slide grooves RG provided in the front side frames 110. Hence, the radiator auxiliary frames 150 joined to the upper outer sides of the radiator panel frame

100 slide toward the rear side of the vehicle in the slide grooves RG provided on the lower side of the vehicle, while restricting tilting of the radiator panel frame 100.

When the collision energy generated by the collision with the object FB1 is further transmitted, crushing of the front side frames 110 and the sub frames 120 progresses, and the radiator auxiliary frames 150 and the upper frame reinforcing members 140 come into contact with each other at the overlapping portions OL.

As a result, the radiator panel frame 100 is restricted from moving toward the rear side of the vehicle at a position in front of the front cross member 130, and tilting of the upper side of the radiator panel frame 100 toward the rear side of the vehicle, as indicated by arrow D, is restricted.

Furthermore, as a result of the radiator auxiliary frames 150 coming into contact with the upper frame reinforcing members 140, the collision energy indicated by arrows F, directed from the front side toward the rear side of the vehicle, is transmitted to the upper frame reinforcing members 140. The upper frame reinforcing members 140 are crushed by the collision energy, and the collision energy is absorbed by the deformation of the upper frame reinforcing members 140.

Because the upper frame reinforcing members 140 are firmly joined to the front side frames 110 and the sub frames 120 on the outer sides in the vehicle width direction, the collision energy present in front of the front cross member 130 is efficiently distributed to the rear side of the vehicle.

The collision energy transmitted to the upper frame reinforcing members 140 is distributed between and absorbed by the toe board 40 and the strut towers 50, which are joined to the rear side of the upper frame reinforcing members 140, as indicated by arrows G and H.

Absorption of the collision energy by the deformation of the front part structure S ends with the end of input of the collision energy.

As described above, the collision energy generated by the collision with the object FB1 is absorbed by crushing and deformation of the front part structure S, which includes the radiator panel frame 100, the front side frames 110, the sub frames 120, the front cross member 130, the upper frame reinforcing members 140, and the radiator auxiliary frames 150.

Furthermore, as a result of the radiator auxiliary frames 150 moving toward the rear side of the vehicle while sliding in the slide grooves RG in the front side frames 110, tilting of the radiator panel frame 100 is restricted. In addition, as a result of the radiator auxiliary frames 150 coming into contact with the upper frame reinforcing members 140, the movement of the radiator panel frame 100 toward the rear side of the vehicle is restricted at a position in front of the front cross member 130.

The collision energy generated by the collision with the object FB1 is distributed in and absorbed by the front chamber FA, which includes the front side frames 110, the front cross member 130, the toe board 40, the strut towers 50, the torque box 60, and the side sills 70.

Hence, the inverter unit 30, which is disposed between, in the vehicle width direction, the front side frames 110, the sub frames 120, and the upper frame reinforcing members 140 extending in the vehicle longitudinal direction on both sides in the vehicle width direction and behind the front cross member 130, is not deformed.

Small-Overlap Collision

Figure 5:
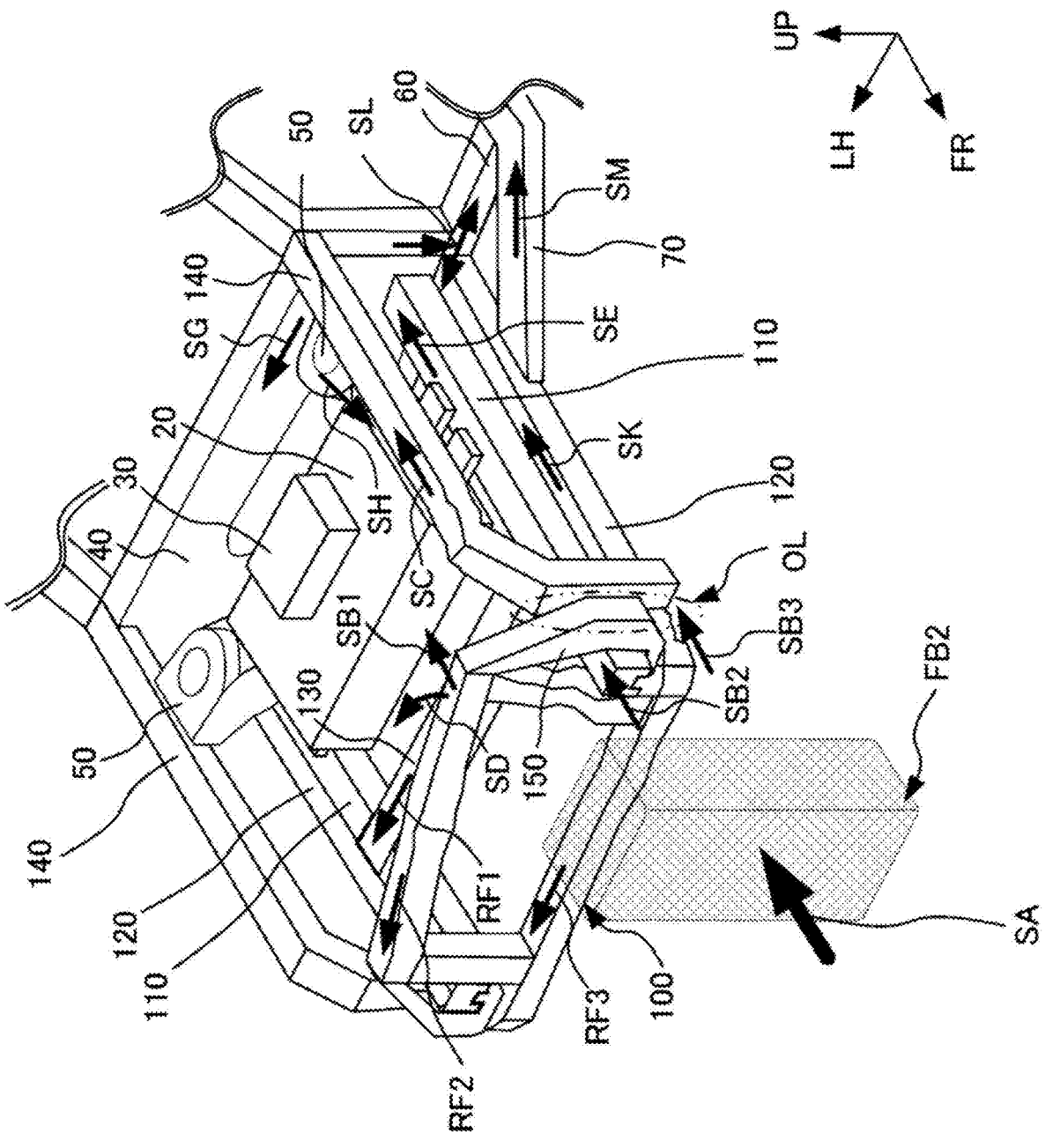
FIG. 5 is a perspective view, as viewed from above, illustrating deformation of the vehicle body front part structure according to the embodiment of the disclosure at the time of a small-overlap collision.

As illustrated in FIG. 5, in a small-overlap collision, an object FB2 collides with the outer right or left front side of the vehicle V, generating collision energy in the direction of arrow SA.

Hereinbelow, the case where the object FB2 collides with the right side of the vehicle V, as viewed from the vehicle traveling direction, will be described.

The collision energy generated by the collision with the object FB2 is transmitted to the rear side of the vehicle via the radiator panel frame 100, the front side frame 110, and the sub frame 120, as indicated by arrows SB1 to SB3.

The collision energy indicated by arrow SB1, directed from the front side toward the rear side of the vehicle, is transmitted to the radiator panel frame 100. The radiator panel frame 100 moves toward the rear side of the vehicle as a result of the front end of the front side frame 110 being crushed by the collision energy.

The radiator panel frame 100 starts to tilt toward the inner rear side of the vehicle, as indicated by arrow SD, so as to rotate about the lower side member and the non-collided side of the radiator panel frame 100.

At this time, the projection PS provided at the bottom of the radiator auxiliary frame 150 slides toward the rear side of the vehicle in the slide groove RG provided in the front side frame 110. Hence, the radiator auxiliary frame 150 joined to the upper outer side of the radiator panel frame 100 slides toward the rear side of the vehicle in the slide groove RG provided on the lower side of the vehicle, while restricting tilting of the radiator panel frame 100.

The collision energy indicated by arrow SB2, directed from the front side to the rear side of the vehicle, is transmitted to the front side frame 110. The front end of the front side frame 110 is crushed by the collision energy, and the collision energy is absorbed by the deformation of the front end of the front side frame 110.

Furthermore, the collision energy transmitted to the front side frame 110, as indicated by arrow SE, is distributed to and absorbed by the toe board 40, which is joined to the rear side of the front side frame 110, as indicated by arrow SG.

The collision energy indicated by arrow SB3, directed from the front side to the rear side of the vehicle, is transmitted to the sub frame 120 via the radiator panel frame 100. The front end of the sub frame 120 is crushed by the collision energy, and the collision energy is absorbed by the deformation of the front end of the sub frame 120.

The collision energy transmitted to the sub frame 120, indicated by arrow SK, is distributed among and absorbed by the toe board 40, the torque box 60, and the side sill 70, as indicated by arrows SG, SL, and SM, respectively.

Furthermore, reaction forces indicated by arrows RF1 to RF3 are generated from the radiator panel frame 100 and the front cross member 130 on the non-collided side. Hence, the collision energy transmitted to the radiator panel frame 100 and the front cross member 130 on the collided side is cancelled by the reaction forces transmitted via the radiator panel frame 100 and the front cross member 130 and is absorbed.

When the collision energy generated by the collision with the object FB2 is further transmitted, crushing of the front side frame 110 and the sub frame 120 progresses, and the radiator auxiliary frame 150 and the upper frame reinforcing member 140 come into contact with each other at the overlapping portion OL.

As a result, the radiator panel frame 100 is restricted from moving toward the rear side of the vehicle at a position in front of the front cross member 130, and tilting of the radiator panel frame 100 toward the inner rear side of the vehicle is restricted.

Furthermore, as a result of the radiator auxiliary frame 150 coming into contact with the upper frame reinforcing member 140, the collision energy indicated by arrow SC, directed from the front side toward the rear side of the vehicle, is transmitted to the upper frame reinforcing member 140. Furthermore, the collision energy is transmitted to the front side frame 110 and the sub frame 120, which are joined to the upper frame reinforcing member 140.

Because the upper frame reinforcing member 140 is firmly joined to the front side frame 110 and the sub frame 120 on the outer side in the vehicle width direction, the collision energy present in front of the front cross member 130 is efficiently distributed to the rear side of the vehicle.

The collision energy transmitted to the upper frame reinforcing member 140 is distributed between and absorbed by the toe board 40 and the strut tower 50, which are joined to the rear side of the upper frame reinforcing member 140, as indicated by arrows SG and SH.

Absorption of the collision energy by the deformation of the front part structure S ends with the end of input of the collision energy.

As described above, the collision energy is absorbed by crushing and deformation of the collided side of the front part structure S, which includes the radiator panel frame 100, the front side frames 110, the sub frames 120, the front cross member 130, the upper frame reinforcing members 140, and the radiator auxiliary frames 150. Furthermore, the collision energy is cancelled by the reaction forces generated from the radiator panel frame 100 and the front cross member 130 on the non-collided side and is absorbed.

Furthermore, as a result of the radiator auxiliary frame 150 moving toward the rear side of the vehicle while sliding in the slide groove RG in the front side frame 110, tilting of the radiator panel frame 100 is restricted. Furthermore, as a result of the radiator auxiliary frame 150 coming into contact with the upper frame reinforcing member 140, the movement of the radiator panel frame 100 toward the rear side of the vehicle is restricted at a position in front of the front cross member 130.

Furthermore, the collision energy is distributed in and absorbed by the front chamber FA, which includes the front side frames 110, the front cross member 130, the toe board 40, the strut towers 50, the torque box 60, and the side sills 70.

Hence, the inverter unit 30, which is disposed between, in the vehicle width direction, the front side frames 110, the sub frames 120, and the upper frame reinforcing members 140 extending in the vehicle longitudinal direction on both sides in the vehicle width direction and behind the front cross member 130, is not deformed.

Under-Ride Collision

Figure 6:
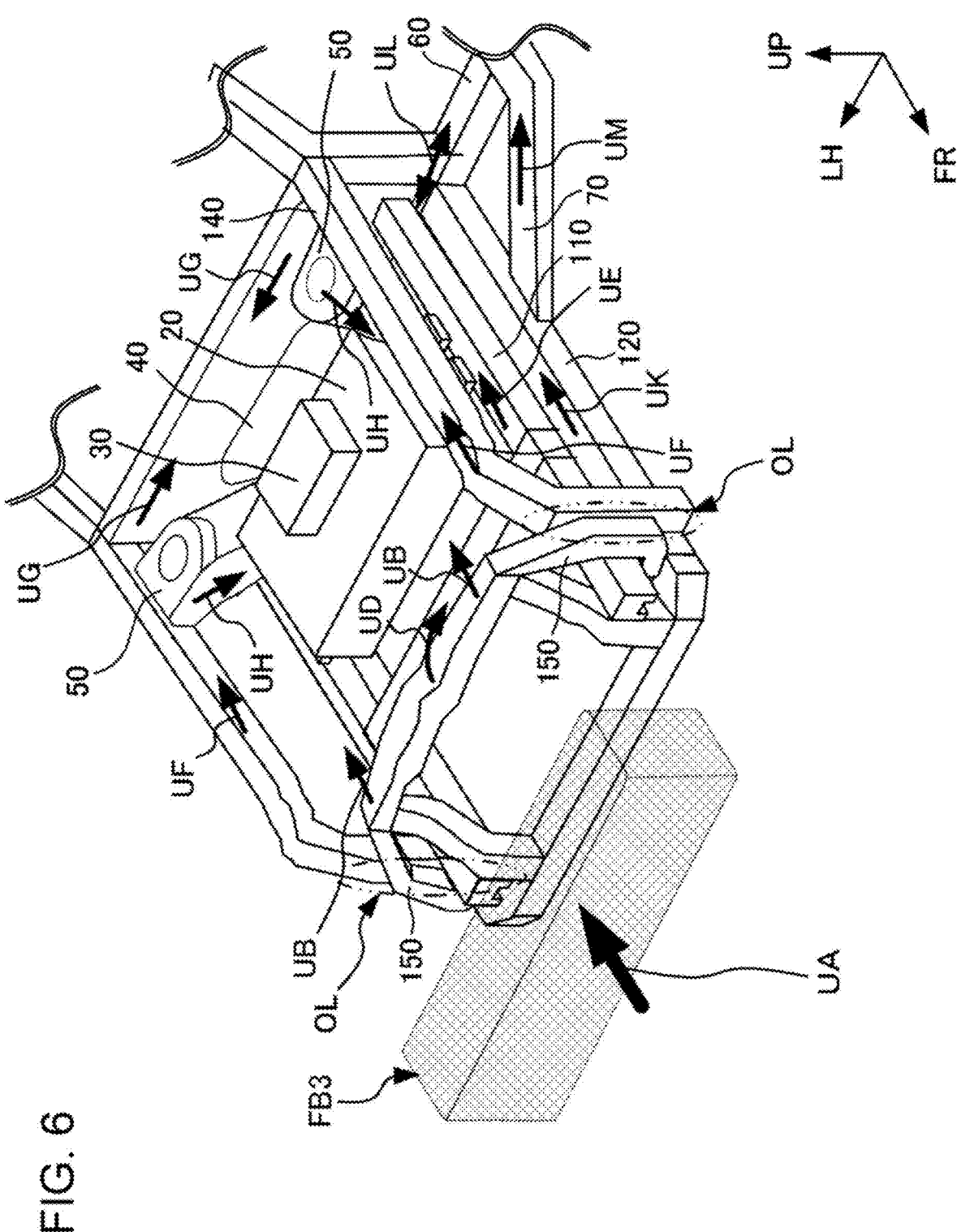
FIG. 6 is a perspective view, as viewed from above, illustrating deformation of the vehicle body front part structure according to the embodiment of the disclosure at the time of an under-ride collision.

As illustrated in FIG. 6, in an under-ride collision, the object FB3 collides with the upper part of the vehicle V, generating collision energy in the direction of arrow UA.

The collision energy generated by the collision with the object FB3 is transmitted to the rear side of the vehicle via the upper side of the radiator panel frame 100, as indicated by arrows UB.

The upper side of the radiator panel frame 100 is pushed by the collision energy and moves toward the rear side of the vehicle. Furthermore, the radiator panel frame 100 starts to tilt toward the lower rear side of the vehicle, as indicated by arrow UD, so as to rotate about the lower side member of the radiator panel frame 100.

At this time, the radiator auxiliary frames 150, which are joined to the upper outer sides of the radiator panel frame 100, slide toward the rear side of the vehicle in the slide grooves RG provided on the lower side of the vehicle, while restricting tilting of the radiator panel frame 100.

Furthermore, when the collision energy generated by the collision with the object FB3 is transmitted, the radiator auxiliary frames 150 and the upper frame reinforcing members 140 come into contact with each other at the overlapping portions OL.

As a result of the radiator auxiliary frames 150 coming into contact with the upper frame reinforcing members 140, the collision energy is transmitted to the upper frame reinforcing members 140, and the front side frames 110 and the sub frames 120, which are joined to the upper frame reinforcing members 140. Furthermore, the movement of the radiator panel frame 100 toward the rear side of the vehicle is restricted at a position in front of the front cross member 130, and tilting of the upper side of the radiator panel frame 100 toward the rear side of the vehicle is restricted.

The collision energy indicated by arrows UF, directed from the front side toward the rear side of the vehicle, is transmitted to the upper frame reinforcing members 140. The upper frame reinforcing members 140 are crushed by the collision energy, and the collision energy is absorbed by the deformation of the upper frame reinforcing members 140.

The collision energy transmitted to the upper frame reinforcing members 140 is distributed between and absorbed by the toe board 40 and the strut towers 50, which are joined to the rear side of the upper frame reinforcing members 140, as indicated by arrows UG and UH.

The collision energy indicated by arrow UE, directed from the front side toward the rear side of the vehicle, is transmitted to the front side frames 110 via the upper frame reinforcing members 140. The front side frames 110 are crushed by the collision energy, and the collision energy is absorbed by the deformation of the front side frames 110.

Furthermore, the collision energy transmitted to the front side frames 110, indicated by arrow UE, is distributed between and absorbed by the toe board 40 and the torque box 60, as indicated by arrows UG and UL.

The collision energy indicated by arrow UK, directed from the front side toward the rear side of the vehicle, is transmitted to the sub frames 120 via the upper frame reinforcing members 140. The sub frames 120 are crushed by the collision energy, and the collision energy is absorbed by the deformation of the sub frames 120.

The collision energy transmitted to the sub frames 120, indicated by arrow UK, is distributed among and absorbed by the toe board 40, the torque box 60, and the side sills 70, as indicated by arrows UG, UL, and UM.

The collision energy is absorbed by crushing and deformation of the front side frames 110, the sub frames 120, the front cross member 130, and the upper frame reinforcing members 140, and is distributed toward the rear side of the vehicle.

Absorption of the collision energy by the deformation of the front part structure S ends with the end of input of the collision energy.

As described above, the collision energy is absorbed by crushing and deformation of the front part structure S, which includes the radiator panel frame 100, the front side frames 110, the sub frames 120, the front cross member 130, the upper frame reinforcing members 140, and the radiator auxiliary frames 150.

Furthermore, as a result of the radiator auxiliary frames 150 moving toward the rear side of the vehicle while sliding in the slide grooves RG in the front side frames 110, tilting of the radiator panel frame 100 is restricted. Furthermore, as a result of the radiator auxiliary frames 150 coming into contact with the upper frame reinforcing members 140, the movement of the radiator panel frame 100 toward the rear side of the vehicle is restricted at a position in front of the front cross member 130.

Furthermore, the collision energy is distributed in and absorbed by the front chamber FA, which includes the front side frames 110, the front cross member 130, the toe board 40, the strut towers 50, the torque box 60, and the side sills 70.

Hence, the inverter unit 30, which is disposed between, in the vehicle width direction, the front side frames 110, the sub frames 120, and the upper frame reinforcing members 140 extending in the vehicle longitudinal direction on both sides in the vehicle width direction and behind the front cross member 130, is not deformed.

The front part structure S according to this embodiment is provided in front of the cabin for occupants, and includes: the radiator panel frame 100 forming a framework extending in the vehicle width direction and the vehicle vertical direction at the front side of the vehicle; a pair of front side frames 110 extending in the vehicle longitudinal direction, on both sides in the vehicle width direction, on the lower side of the vehicle and joined to the radiator panel frame 100 at the front ends thereof, the pair of front side frames 110 having, in the lower surfaces thereof, the recessed slide grooves RG extending from the front ends thereof toward the rear side of the vehicle; the sub frames 120 extending in the vehicle longitudinal direction, below and on the outer side of the front side frames 110 in the vehicle width direction, and joined to the lower outer parts, in the vehicle width direction, of the radiator panel frame 100 at the front ends thereof; the inverter unit 30 disposed between the front side frames 110 in the vehicle width direction and configured to generate a voltage to be supplied to the vehicle driving motor; the front cross member 130 extending in the vehicle width direction in front of the inverter unit 30 and joined to the front side frames 110 at both ends thereof in the vehicle width direction; a pair of upper frame reinforcing members 140 extending in the vehicle longitudinal direction, on both sides in the vehicle width direction, on the upper side of the vehicle, bent downward toward the front side of the vehicle at positions in front of the front cross member 130, and joined to the outer parts of the sub frames 120 at positions behind the radiator panel frame 100, at the lower ends thereof; and the radiator auxiliary frames 150 extending in the vehicle vertical direction on the outer sides of the radiator panel frame 100 in the vehicle width direction, bent inward in the vehicle width direction at the lower ends thereof along the lower surfaces of the front side frames 110, and having, at the inner ends thereof in the vehicle width direction, the projections PS to slidably engage with the slide grooves RG formed in the front side frames 110.

In full-overlap, small-overlap, and under-ride collisions, the collision energy directed to the rear side of the vehicle is transmitted to the radiator panel frame 100. At this time, the radiator auxiliary frames 150 slide toward the rear side of the vehicle, thus restricting the radiator panel frame part 100 from tilting toward the rear side of the vehicle. Because the upper frame reinforcing members 140 are firmly joined to the front side frames 110 and the sub frames 120 on the outer sides in the vehicle width direction, the collision energy present in front of the front cross member 130 is efficiently distributed to the rear side of the vehicle. The collision energy is absorbed by crushing and deformation of the front part structure S, which includes the radiator panel frame 100, the front side frames 110, the front cross member 130, the upper frame reinforcing members 140, and the radiator auxiliary frames 150. Furthermore, the collision energy is distributed in and absorbed by the front chamber FA, which includes the front side frames 110, the front cross member 130, the toe board 40, the strut towers 50, the torque box 60, and the side sills 70.

In full-overlap, small-overlap, and under-ride collisions, in the front part structure S, the radiator auxiliary frames 150 slide toward the rear side of the vehicle, restricting the radiator panel frame 100 from tilting toward the rear side of the vehicle, and crushing and deformation of the front side frames 110, the sub frames 120, and the upper frame reinforcing members 140, and the reaction forces generated therefrom absorb the collision energy. Because the upper frame reinforcing members 140 are firmly joined to the front side frames 110 and the sub frames 120 on the outer sides in the vehicle width direction, the collision energy can be efficiently distributed to the rear side of the vehicle without deforming the inverter unit 30 disposed behind the front cross member 130.

Hence, it is possible to prevent deformation of the inverter unit 30 in multiple types of frontal collisions.

Furthermore, in the front part structure S according to this embodiment, the plane obtained by projecting the radiator auxiliary frames 150 toward the rear side of the vehicle and the plane obtained by projecting the upper frame reinforcing members 140 toward the front side of the vehicle overlap each other at the overlapping portions OL extending in the vehicle vertical direction when viewed from the vehicle traveling direction.

That is, in full-overlap, small-overlap, and under-ride collisions, the upper frame reinforcing members 140 and the radiator auxiliary frames 150 come into contact with each other at the overlapping portions OL. Thus, the overlapping portions OL restrict the radiator auxiliary frames 150 from sliding toward the rear side of the vehicle, at positions in front of the front cross member 130. By allowing the collision energy transmitted to the radiator auxiliary frames 150 to be transmitted to the front side frames 110, the sub frames 120, and the upper frame reinforcing members 140 via the overlapping portions OL, the collision energy can be distributed among the toe board 40, the strut towers 50, the torque box 60, and the side sills 70.

Hence, it is possible to prevent deformation of the inverter unit 30 in multiple types of frontal collisions.

Although the embodiment of the disclosure has been described in detail above with reference to the drawings, the structure of the disclosure is not limited to one described above, and designs and the like within a scope not departing from the gist of the disclosure are also included.

The invention claimed is:

1. A vehicle body front part structure provided in front of a cabin configured to accommodate one or more occupants in a vehicle, the vehicle body front part structure comprising:

a radiator panel frame forming a framework extending in a vehicle width direction and a vehicle vertical direction of the vehicle at a front side of the vehicle;

front side frames in a pair, the front side frames extending in a vehicle longitudinal direction of the vehicle, on both sides of the vehicle in the vehicle width direction, on a lower side of the vehicle, and each comprising a front end joined to the radiator panel frame, the front side frames each comprising a lower surface comprising a recessed slide groove extending from the front end toward a rear side of the vehicle;

sub frames extending in the vehicle longitudinal direction below and on outer sides of the front side frames in the vehicle width direction respectively, and each comprising a front end joined to a lower outer part of the radiator panel frame in the vehicle width direction;

an inverter unit disposed between the front side frames in the vehicle width direction and configured to generate a voltage to be supplied to a driving motor of the vehicle;

a front cross member extending in the vehicle width direction in front of the inverter unit and comprising both ends respectively joined to the front side frames in the vehicle width direction;

upper frame reinforcing members in a pair, the upper frame reinforcing members extending in the vehicle longitudinal direction on both sides of the vehicle in the vehicle width direction on an upper side of the vehicle, the upper frame reinforcing members being bent downward toward the front side of the vehicle in front of the front cross member, and each being joined to a corresponding one of the front side frames and a corresponding one of the sub frames behind the radiator panel frame; and radiator auxiliary frames extending in the vehicle vertical direction on outer sides of the radiator panel frame in the vehicle width direction, the radiator auxiliary frames each comprising a lower end bent inward in the vehicle width direction along the lower surface of a corresponding one of the front side frames, and each comprising an inner end comprising a projection in the vehicle width direction, the projection being configured to slidably engage with the recessed slide groove of the corresponding one of the front side frames.

2. The vehicle body front part structure according to claim 1, wherein a plane obtained by projecting the radiator auxiliary frames toward the rear side of the vehicle and a plane obtained by projecting the upper frame reinforcing members toward the front side of the vehicle overlap each other at overlapping portions extending in the vehicle vertical direction when viewed from a traveling direction of the vehicle.

* * * * *